US012770754B2

(12) United States Patent
Son et al.

(10) Patent No.: US 12,770,754 B2
(45) Date of Patent: Oct. 20, 2026

(54) ANODE FOR BETAVOLTAIC BATTERIES AND METHOD FOR MANUFACTURING THE SAME

(71) Applicants: Hyundai Motor Company, Seoul (KR); Kia Corporation, Seoul (KR); Daegu Gyeongbuk Institute of Science and Technology, Daegu (KR)

(72) Inventors: Sam Ick Son, Suwon-Si (KR); Su Il In, Seoul (KR); Hong Soo Kim, Daegu (KR); Jun Ho Lee, Gimhae-Si (KR); Yun Ju Hwang, Seoul (KR)

(73) Assignees: Hyundai Motor Company, Seoul (KR); Kia Corporation, Seoul (KR); Daegu Gyeongbuk Institute of Science and Technology, Daegu (KR)

(*) Notice: Subject to any disclaimer, the term of this patent is extended or adjusted under 35 U.S.C. 154(b) by 411 days.

(21) Appl. No.: 18/079,408

(22) Filed: Dec. 12, 2022

(65) Prior Publication Data

US 2024/0029910 A1 Jan. 25, 2024

(30) Foreign Application Priority Data

Jul. 21, 2022 (KR) ........................ 10-2022-0090280

(51) Int. Cl.
*G21H 1/02* (2006.01)
*G21H 1/06* (2006.01)

(52) U.S. Cl.
CPC ................. *G21H 1/02* (2013.01); *G21H 1/06* (2013.01)

(58) Field of Classification Search
CPC ........... G21H 1/06; G21H 1/02; H01G 9/2059
See application file for complete search history.

(56) References Cited

U.S. PATENT DOCUMENTS

| | | | | |
|---|---|---|---|---|
| 5,606,213 | A | 2/1997 | Kherani et al. | |
| 2007/0209696 | A1* | 9/2007 | Duerr | H01G 9/2031 136/252 |
| 2011/0083732 | A1* | 4/2011 | Hung | C07C 211/63 8/636 |
| 2012/0305069 | A1* | 12/2012 | Kim | H01G 9/2036 977/948 |

FOREIGN PATENT DOCUMENTS

| | | | |
|---|---|---|---|
| JP | 2014133685 | A | 7/2014 |
| KR | 10-2012-0071241 | A | 7/2012 |
| KR | 10-2019-0053126 | A | 5/2019 |
| KR | 102134223 | B1 | 7/2020 |
| KR | 102363954 | B1 | 2/2022 |

OTHER PUBLICATIONS

Hwang Supplemental (Year: 2020).*
Hwang (Year: 2020).*
Ma Supplemental (Year: 2013).*

(Continued)

*Primary Examiner* — Sadie White
(74) *Attorney, Agent, or Firm* — Banner & Witcoff, Ltd.

(57) ABSTRACT

An anode for betavoltaic batteries and a method for manufacturing the anode are described. In the anode, quantum dots including a radioactive isotope are provided to a radiation absorber so as to be introduced as a beta source.

20 Claims, 7 Drawing Sheets

(56) References Cited

OTHER PUBLICATIONS

Ma (Year: 2013).*
Wang (Year: 2022).*
Zhang (Year: 2015).*
Yoo et al. "Conceptual Design to Increase Power of Betavoltaic Battery using Ni-63 Beta Radioisotope and Semiconductor", The Korean Society of Mechanical Engineers, Nov. 2010, 4193-4195(3 pages), http://www.dbpia.co.kr/journal/articleDetail?nodeId=NODE01552599.
Chang et al. "A betavoltaic microcell based on Au/s-SWCNTs/Ti Schottky junction", www.elsevier.com/locate/sna <http://www.elsevier.com/locate/sna>, pp. 1-5.

* cited by examiner

Reaction Formula 1

ANODE FOR BETAVOLTAIC BATTERIES AND METHOD FOR MANUFACTURING THE SAME

CROSS-REFERENCE TO RELATED APPLICATION

This application claims under 35 U.S.C. § 119 (a) the benefit of priority to Korean Patent Application No. 10-2022-0090280 filed on Jul. 21, 2022, the entire contents of which are incorporated herein by reference.

BACKGROUND

(a) Technical Field

The present disclosure relates to an anode for betavoltaic batteries and a method for manufacturing the same.

(b) Discussion of the Background

A betavoltaic battery is a battery which absorbs beta rays emitted from a radioactive isotope through the surface of P-N junction semiconductors, and converts the beta rays into electric energy. Electron-hole pairs may be produced in a space charge region in the P-N junction semiconductors by the beta rays, and carriers generated thereby have the current-voltage characteristics of the betavoltaic battery.

Radioactive isotopes have energy spectra of several eV to hundreds of keV, and intrinsic maximum energy and average energy, depending on nuclides. As the half-life of a nuclide increases, the lifespan of a betavoltaic battery using the nuclide increases, but the output power of the betavoltaic battery decreases due to decrease in the decay rate of the nuclide. Therefore, it is important to properly select a radioactive isotope to satisfy a requirement.

In the betavoltaic battery, efficiency of kinetic energy of beta particles may be varied depending on the structure of the betavoltaic battery. As one example, in a betavoltaic battery including P-N junction semiconductors having a plane structure, a beta source is located on the P-N junction semiconductors, and thus, beta particles emitted upwards and laterally from the beta source may not be converted into electric power and the beta particles may disappear. As another example, in a betavoltaic battery in which a beta source is located between a P-type semiconductor and an N-type semiconductor, when the thickness of a material including the beta source is increased, the number of electrons and holes which are recombined with each other is increased but, when the thickness of such a material is decreased, the amount of the beta source included in the material is decreased. Further, the betavoltaic batteries in these examples have a small surface area, and thus, have a low current per unit area.

A dye-sensitized betavoltaic battery different from a betavoltaic battery including P-N junction semiconductors may be used. However, in the dye-sensitized betavoltaic battery, a distance between a radiation absorber and a beta source may be long, and thus energy loss may be great.

The above information disclosed in this Background section is only for enhancement of understanding of the background of the disclosure and therefore it may contain information that does not form the prior art that is already known to a person of ordinary skill in the art.

SUMMARY

The following summary presents a simplified summary of certain features. The summary is not an extensive overview and is not intended to identify key or critical elements.

The present disclosure has been made in an effort to solve the above-described problems, and it is an object of the present disclosure to provide a betavoltaic battery having low energy loss. In one or more implementations, an anode for betavoltaic batteries in which quantum dots including a radioactive isotope may be provided to a radiation absorber so as to be introduced as a beta source. A method for manufacturing the anode for betavoltaic batteries will be described.

It is another object of the present disclosure to provide a betavoltaic battery having improved electrochemical properties.

It is yet another object of the present disclosure to provide a betavoltaic battery having high energy absorption.

An anode for betavoltaic batteries may include a conductive substrate, a radiation absorption layer including inorganic particle(s) and dye(s) adsorbed onto the inorganic particle(s), and a beta emission layer including quantum dots. The beta emission layer may be located/disposed on the radiation absorption layer, and the quantum dots may include a radioactive isotope configured to emit beta ray(s). The radiation absorption layer may be located/disposed on the conductive substrate.

The conductive substrate may include at least one selected from the group consisting of fluorine doped tin oxide (FTO) glass, indium tin oxide (ITO) glass, indium zinc oxide (IZO) glass, aluminum doped zinc oxide (AZO) glass, gallium doped zinc oxide (GZO) glass, and combinations thereof.

The inorganic particle(s) may include titanium dioxide ($TiO_2$).

The inorganic particle(s) may be treated with titanium tetrachloride ($TiCl_4$).

The dyes may include at least one selected from the group consisting of N719, N3, N749, and combinations thereof.

The radiation absorption layer may include a first layer including first inorganic particles having an average particle diameter of about 10 nm to about 50 nm and a first dye adsorbed onto the first inorganic particle(s), and a second layer including second inorganic particles having an average particle diameter of about 100 nm to about 500 nm and a second dye adsorbed onto the second inorganic particle(s). The second layer may be located/disposed on the first layer.

A thickness ratio of the first layer to the second layer may be about 1:0.5 to about 1:2.

The quantum dots may include a heated product resulting from a polymer of a compound, represented by Chemical Formula 1 below, and quaternary ammonium ions, Chemical Formula 1

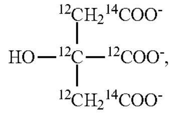

and $^{14}C$ may indicate a radioactive isotope of carbon.

An average particle diameter of the quantum dots may be about 4 nm to about 20 nm.

A betavoltaic battery may include the above-described anode, an encapsulant located on the anode and impregnated with an electrolyte, and a cathode located on the encapsulant.

The cathode may include a conductive substrate, and an electrode layer including a precious metal. The electrode layer may be located/disposed on the conductive substrate, and the precious metal may include platinum (Pt).

A method for manufacturing an anode for betavoltaic batteries may include forming a radiation absorption layer by applying paste(s) including inorganic particle(s) to a conductive substrate, preparing a precursor solution by mixing an organic acid, represented by Chemical Formula 2 below, and an ammonia solution, forming a beta emission layer including quantum dots by applying the precursor solution to the radiation absorption layer and heating the precursor solution, and adsorbing dye(s) onto the inorganic particle(s) by immersing an acquired result in the dyes.

The quantum dots may include a radioactive isotope configured to emit beta ray(s), Chemical Formula 2

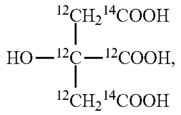

wherein $^{14}C$ indicates a radioactive isotope of carbon.

The method may include treating the inorganic particle(s) with titanium tetrachloride ($TiCl_4$) by soaking the radiation absorption layer in titanium tetrachloride ($TiCl_4$) and then performing heat treatment.

The forming the radiation absorption layer may include preparing a first layer by applying a paste including first inorganic particle(s) having an average particle diameter of about 10 nm to about 50 nm to the conductive substrate, and preparing a second layer by applying a paste including second inorganic particle(s) having an average particle diameter of about 100 nm to about 500 nm to the first layer.

Other aspects and/or preferred examples of the present disclosure are described below.

Figure 1:
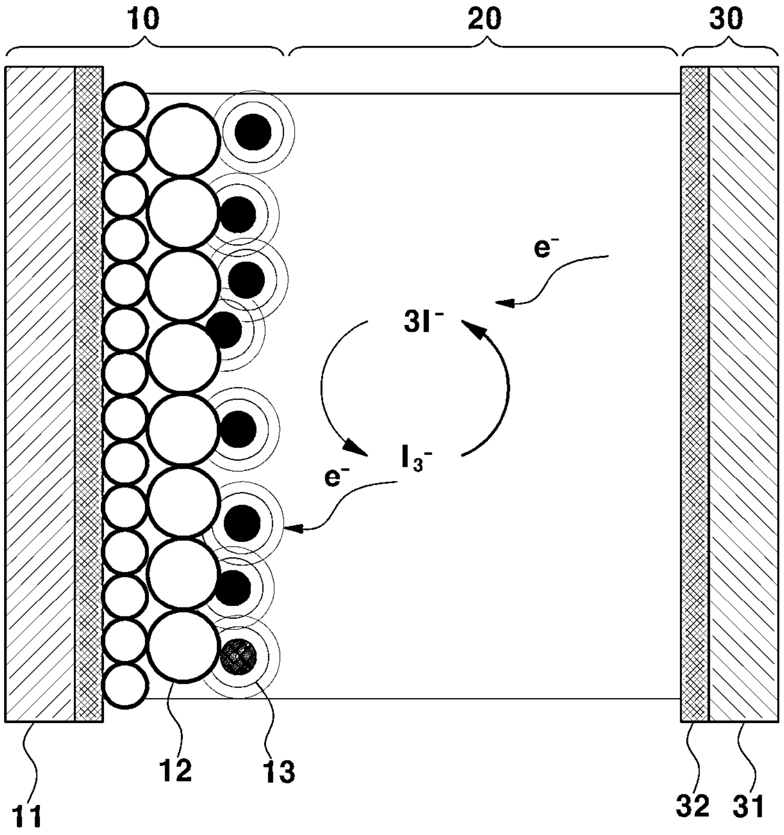
FIG. 1 shows a cross-sectional view of a betavoltaic battery.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The above-described objects, other objects, advantages and features of the present disclosure will become apparent from the descriptions with reference to the accompanying drawings. However, the present disclosure is not limited to the examples explicitly disclosed herein and may be implemented in various different forms. The examples are provided to make the description of the present disclosure thorough and to fully convey the scope of the present disclosure to those skilled in the art.

In the following description, the same elements are denoted by the same reference numerals even when they are depicted in different drawings. In the drawings, the dimensions of structures may be exaggerated compared to the actual dimensions thereof, for clarity of description. In the following description of the embodiments, terms, such as "first" and "second", may be used to describe various elements but do not limit the elements. These terms may be used only to distinguish one element from other elements. For example, a first element may be named a second element, and similarly, a second element may be named a first element. Singular expressions may encompass plural expressions, unless they have clearly different contextual meanings.

In the following description, terms, such as "including", "comprising" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

FIG. 1 is a cross-sectional view showing a betavoltaic battery. Referring to this figure, the betavoltaic battery may include an anode 10, an encapsulant 20 located on the anode 10 and impregnated with an electrolyte, and a cathode 30 located on the encapsulant 20.

Figure 2:
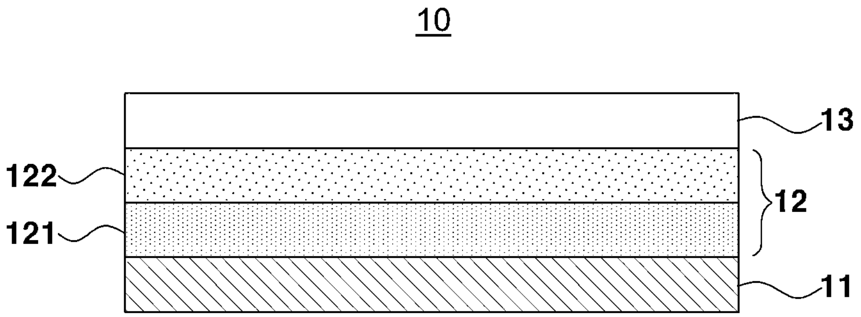
FIG. 2 shows a cross-sectional view of an anode.

FIG. 2 is a cross-sectional view showing the anode 10 (e.g., the anode 10 of FIG. 1). Referring to this figure, the anode 10 may include a conductive substrate 11, a radiation absorption layer 12 located on the conductive substrate 11, and a beta emission layer 13 located on the radiation absorption layer 12.

The conductive substrate 11 may include at least one selected from the group consisting of: fluorine doped tin oxide (FTO) glass, indium tin oxide (ITO) glass, indium zinc oxide (IZO) glass, aluminum doped zinc oxide (AZO) glass, gallium doped zinc oxide (GZO) glass, and/or combinations thereof.

The conductive substrate 11 may be treated with titanium tetrachloride ($TiCl_4$). Thereby, the radiation absorption layer 12 having porosity may acquire sufficient surface sites with the conductive material 11. At the same time, recombination of electrons transferred to the conductive substrate 11 through the radiation absorption layer 12 with iodine ions ($I^{3-}$) in the electrolyte may be prevented, and thus, photocurrent loss and efficiency reduction may be suppressed.

The radiation absorption layer 12 may include inorganic particles. The inorganic particles may include titanium dioxide ($TiO_2$).

The inorganic particles may be treated with titanium tetrachloride ($TiCl_4$). Thereby, bonding force between the inorganic particles may be increased, and thus, the amount of dyes adsorbed onto the inorganic particles may be increased.

The dyes may include ruthenium (Ru)-based dyes. For example, the dyes may include at least one selected from the group consisting of: N719, N3, N749, and/or combinations thereof.

N719 may be a compound represented by Chemical Formula 3 below.

Chemical Formula 3

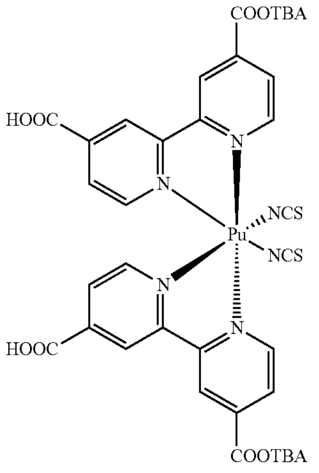

Here, TBA may be tetrabutyl ammonium.

N3 may be a compound represented by Chemical Formula 4 below.

Chemical Formula 4

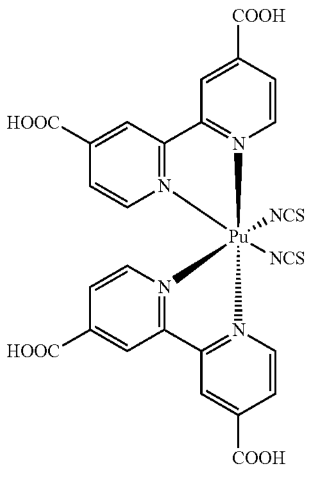

N749 may be a compound represented by Chemical Formula 5 below.

Chemical Formula 5

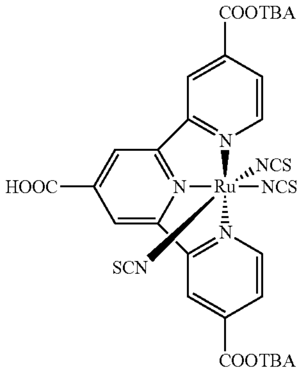

Here, TBA may be tetrabutyl ammonium.

The radiation absorption layer 12 may have a multilayered structure including a first layer 121 and a second layer 122, for example, as shown in FIG. 2. The first layer 121 may include first inorganic particles having a small average particle diameter and a first dye adsorbed onto the first inorganic particles, and the second layer 122 may include second inorganic particles having a large average particle diameter and a second dye adsorbed the second inorganic particles. If the radiation absorption layer 12 is formed to have the multilayered structure including inorganic particles having different average particle diameters, energy absorption may be increased.

The average particle diameter of the first inorganic particles may be 10 nm to 50 nm, and the average particle diameter of the second inorganic particles may be 100 nm to 500 nm.

The first dye and the second dye may be ruthenium-based dyes, respectively, and the first dye and the second dye may be different or the same.

The thickness ratio of the first layer 121 to the second layer 122 may be 1:0.5 to 1:2. If the thickness ratio is within the above range, energy absorption may be increased.

The radiation absorption layer 12 may have a thickness of 2 μm to 25 μm. If the thickness of the radiation absorption layer 12 is within this range, the radiation absorption layer 12 may effectively transmit electrons (beta particles) emitted from quantum dots to the conductive substrate 11.

Figure 3:
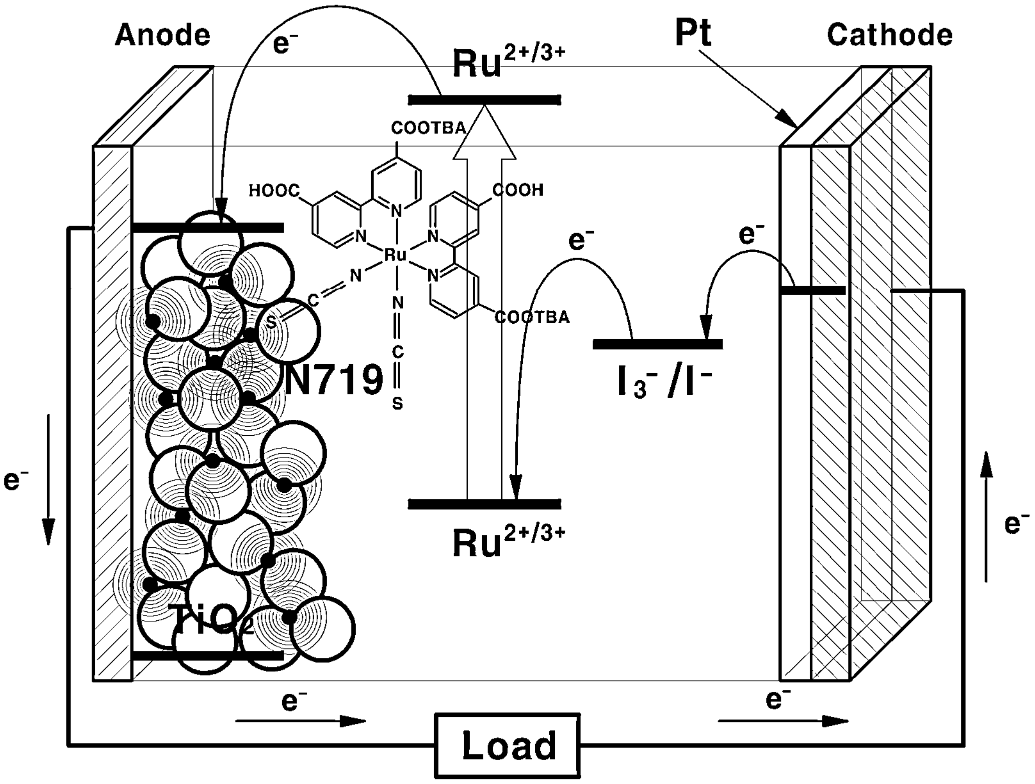
FIG. 3 shows a reference view of the operating method of the betavoltaic battery.

FIG. 3 is a reference view showing the operating method of the betavoltaic battery. Referring to this figure, electrons (beta particles) emitted from quantum dots of the beta emission layer are transmitted to the conductive substrate of the anode through radiation absorption layer. The electrons (beta particles) migrate to the cathode through an external conductor, pass through an electrode layer (Pt) and the electrolyte ($I^-$) through electrochemical reactions, and are transmitted to the dyes of the radiation absorption layer. Electric energy may be produced through migration of the above electrons (beta particles).

The beta emission layer 13 (e.g., the beta emission layer 13 shown in FIGS. 1 and 2) may include quantum dots, and the quantum dots may include a radioactive isotope which emits beta rays. The quantum dots may be acquired by firing or carbonizing a polymer of a compound, represented by Chemical Formula 1 below, and quaternary ammonium ions.

Chemical Formula 1

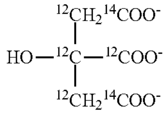

Here, $^{14}C$ indicates a radioactive isotope of carbon.

The quaternary ammonium ions may include at least one selected from the group consisting of: $NH^{4+}$, $NRH^{3+}$, $NR_2H^{2+}$, $NR_3H^+$, and/or combinations thereof. Here, R may be a substituted or unsubstituted alkyl group having 1 to 3 carbon atoms.

Figure 7:
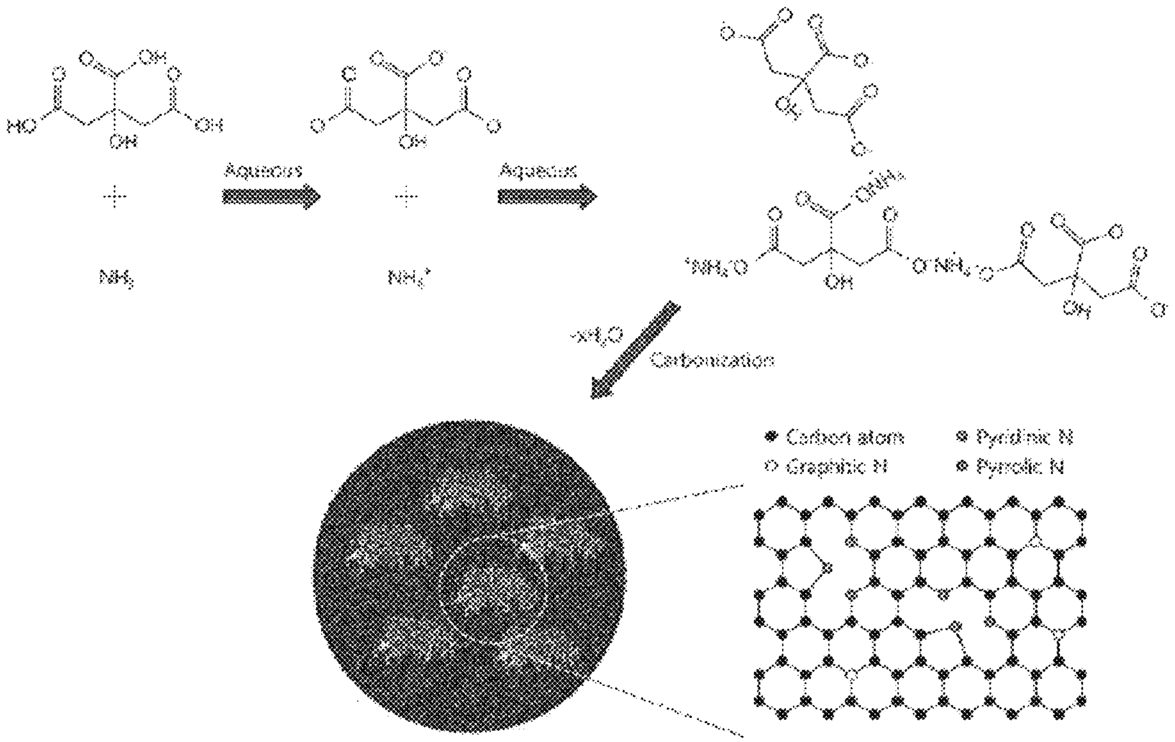
FIG. 7 shows Reaction Formula 1.

The quantum dots may be acquired by Reaction Formula 1 shown in FIG. 7. However, Reaction Formula 1 is an example of implementation for aiding in understanding of the present disclosure, and thus, aspects of the present disclosure are not limited thereto.

The average particle diameter of the quantum dots may be 4 nm to 20 nm. If the average particle diameter is less than 4 nm, the sizes of the quantum dots may not be uniform, and the lifespan of the quantum dots may be short due to heat, etc. On the other hand, if the average particle diameter exceeds 20 nm, the number of quantum dots within a given area is small, and thus, the amount of emission of beta rays may be reduced.

The thickness of the beta emission layer 13 may be properly adjusted depending on the purpose of the betavoltaic battery.

The encapsulant 20 may provide a space which may be impregnated with an electrolyte, for example, between the anode 10 and the cathode 30.

The electrolyte may include an iodine-based compound.

The cathode 30 may include a conductive substrate 31 and an electrode layer 32 located on the conductive substrate 31.

The conductive substrate 31 may include at least one selected from the group consisting of: fluorine doped tin oxide (FTO) glass, indium tin oxide (ITO) glass, indium zinc oxide (IZO) glass, aluminum doped zinc oxide (AZO) glass, gallium doped zinc oxide (GZO) glass, and/or combinations thereof.

The electrode layer 32 may include a precious metal. The precious metal may include platinum (Pt).

A method for manufacturing the anode 10 for betavoltaic batteries according to the present disclosure may include forming the radiation absorption layer 12 by applying pastes including inorganic particles to the conductive substrate 11, preparing a precursor solution by mixing an organic acid and an ammonia solution, forming the beta emission layer 13 including the quantum dots by applying the precursor solution to the radiation absorption layer 12 and heating the precursor solution, and adsorbing dyes onto the inorganic particles by immersing an acquired result in the dyes.

The conductive substrate 11 may be treated with titanium tetrachloride ($TiCl_4$), as described above. Titanium tetrachloride ($TiCl_4$) treatment of the conductive substrate 11 is not limited to a specific method and, for example, the conductive substrate 11 may be soaked in titanium tetrachloride ($TiCl_4$) and then be heat-treated.

The radiation absorption layer 12 may be formed by preparing the first layer 121 by applying a paste including the first inorganic particles having an average particle diameter of 10 nm to 50 nm to the conductive substrate 11, and preparing the second layer 122 by applying a paste including the second inorganic particles having an average particle diameter of 100 nm to 500 nm to the first layer 121.

In order to treat the inorganic particles with titanium tetrachloride ($TiCl_4$), the radiation absorption layer 12 may be soaked in titanium tetrachloride ($TiCl_4$) and may be heat-treated.

The precursor solution may be prepared by inputting the ammonia solution to a mixed solution including the organic acid, represented by Chemical Formula 2, and an aqueous ethanol solution.

Chemical Formula 2

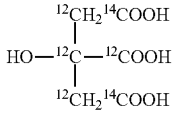

Here, $^{14}C$ indicates a radioactive isotope of carbon.

The aqueous ethanol solution may be an aqueous ethanol solution having a concentration of 85.0% by volume to 99.9% by volume.

5 parts by volume to 20 parts by volume of the ammonia solution may be input based on 100 parts by volume of the mixed solution. If the input amount of the ammonia solution is less than 5 parts by volume, condensation reaction between the organic acid and ammonia may occur. If the input amount of the ammonia solution exceeds 20 parts by volume, an excessive amount of moisture is removed and thus the surfaces of the quantum dots may be damaged.

The beta emission layer 13 may be formed by applying the precursor solution to the radiation absorption layer 12 and heating the precursor solution.

Application of the precursor solution is not limited to a specific method, and the precursor solution may be applied to the radiation absorption layer 12 through bar coating, spray coating, drop coating, etc. For example, the precursor solution may be applied to the radiation absorption layer 12 dropwise while being dried.

The heating of the precursor solution may be performed at a temperature of 140° C. to 300° C. for 2 hours to 8 hours. If the heating temperature is lower than 140° C., carbon nuclei may not be formed properly. If the heating temperature exceeds 300° C., the sizes of the quantum dots may be rapidly increased. Further, if the heating time is less than 2 hours, the amount of energy necessary for the reactions is small and thus the sizes of the quantum dots may be excessively decreased. If the heating time exceeds 8 hours, the sizes of the quantum dots may become non-uniform due to an excess of energy.

The dyes may be adsorbed onto the inorganic particles by immersing a stack including the conductive substrate 11, the radiation absorption layer 12 and the beta emission layer 13 in the dyes. The anode for betavoltaic batteries may be acquired by cleaning the stack with ethanol or the like and drying the stack, for example, after the immersing the stack in the dyes has been completed.

Hereinafter, various examples will be described in more detail. The following examples are exemplary and the following descriptions thereof are not intended to limit the scope of the disclosure.

Performance Evaluation Depending on Titanium Tetrachloride ($TiCl_4$) Treatment

Example 1

Manufacture of Anode

FTO glass was put into 1% Mucasol® in water serving as a cleaning solution, and was sonicated for 30 minutes. The cleaned FTO glass and 7.5 ml of 40 mM $TiCl_4$ solution were put into a petri dish. The petri dish was placed on a hot plate of a temperature of about 70° C. for about 30 minutes. Thereafter, the hot plate was heated to about 500° C. at a rate of about 5° C./min, and was then heated for about 30 minutes.

A rectangular pattern having a size of 1.0 cm in width×0.4 cm in length was formed using a 3M® tape at the center of the FTO glass treated with titanium tetrachloride ($TiCl_4$). A paste including $TiO_2$ having an average particle diameter of about 20 nm was applied to the FTO glass having the pattern formed thereon. A first layer was formed by heating an acquired result to a temperature of about 500° C. at a rate of about 5° C./min, and then heating the result for about 30 minutes.

A paste including $TiO_2$ having an average particle diameter of about 300 nm was applied to the first layer. A second layer was formed by heating an acquired result to a temperature of about 500° C. at a rate of about 5° C./min, and then heating the result for about 30 minutes.

After formation of the second layer, the FTO glass and 7.5 ml of 40 mM $TiCl_4$ solution were put into a petri dish. The petri dish was placed on a hot plate of a temperature of about 70° C. for about 30 minutes. Thereafter, the hot plate was heated to about 500° C. at a rate of about 5° C./min, and was then heated for about 30 minutes.

In the state in which a beta emission layer is not formed, the FTO glass was immersed in 0.5 mM N719, which is a ruthenium (Ru)-based dye, at a room temperature for about 24 hours so that the dye was adsorbed onto the inorganic particles. Thereafter, the dye was washed off with anhydrous alcohol (99.5%), and was dried with an air gun.

Manufacture of Cathode

Two electrolyte inlets were formed in FTO glass using a drill. The FTO glass was put into anhydrous ethyl alcohol, and was cleaned through sonication for 30 minutes.

A platinum solution was prepared by mixing 0.05179 g of $H_2PtCl_4$ and 10 ml of isopropanol.

A rectangular pattern having a size of 1.0 cm in width×1.5 cm in length was formed using a 3M® tape on the FTO glass. An electrode layer was formed by dropping 10 μl of the platinum solution thereon three times. An acquired result was heated to about 400° C. at a rate of about 10° C./min, and was then heated for about 15 minutes.

Manufacture of Betavoltaic Battery

A stack was acquired by interposing a Surlyn® sheet cut to have a size of 1.0 cm in width×1.6 cm in length between the anode and the cathode, and then performing heat treatment at a temperature of about 120° C. An $I^-/I^{3-}$ electrolyte was injected into the electrolyte inlets.

Comparative Example 1

Manufacture of Anode

FTO glass was put into 1% Mucasol® in water serving as a cleaning solution, and was sonicated for 30 minutes.

A rectangular pattern having a size of 1.0 cm in width×0.4 cm in length was formed using a 3M® tape at the center of the cleaned FTO glass, A paste including $TiO_2$ having an average particle diameter of about 20 nm was applied to the FTO glass having the pattern formed thereon. A first layer was formed by heating an acquired result to a temperature of about 500° C. at a rate of about 5° C./min, and then heating the result for about 30 minutes.

A paste including $TiO_2$ having an average particle diameter of about 300 nm was applied to the first layer. A second layer was formed by heating an acquired result to a temperature of about 500° C. at a rate of about 5° C./min, and then heating the result for about 30 minutes.

In the state in which a beta emission layer is not formed, the FTO glass was immersed in 0.5 mM N719, which is a ruthenium (Ru)-based dye, at a room temperature for about 24 hours so that the dye was adsorbed onto the inorganic particles. Thereafter, the dye was washed off with anhydrous alcohol (99.5%), and was dried with an air gun.

Manufacture of Cathode

Two electrolyte inlets were formed in FTO glass using a drill. The FTO glass was put into anhydrous ethyl alcohol, and was cleaned through sonication for 30 minutes.

A platinum solution was prepared by mixing 0.05179 g of $H_2PtCl_4$ and 10 ml of isopropanol.

A rectangular pattern having a size of 1.0 cm in width×1.5 cm in length was formed using a 3M® tape on the FTO glass. An electrode layer was formed by dropping 10 μl of the platinum solution thereon three times. An acquired result was heated to about 400° C. at a rate of about 10° C./min, and was then heated for about 15 minutes.

Manufacture of Betavoltaic Battery

A stack was acquired by interposing a Surlyn® sheet cut to have a size of 1.0 cm in width×1.6 cm in length between the anode and the cathode, and then performing heat treatment at a temperature of about 120° C. An $I^-/I^{3-}$ electrolyte was injected into the electrolyte inlets.

Figure 4:
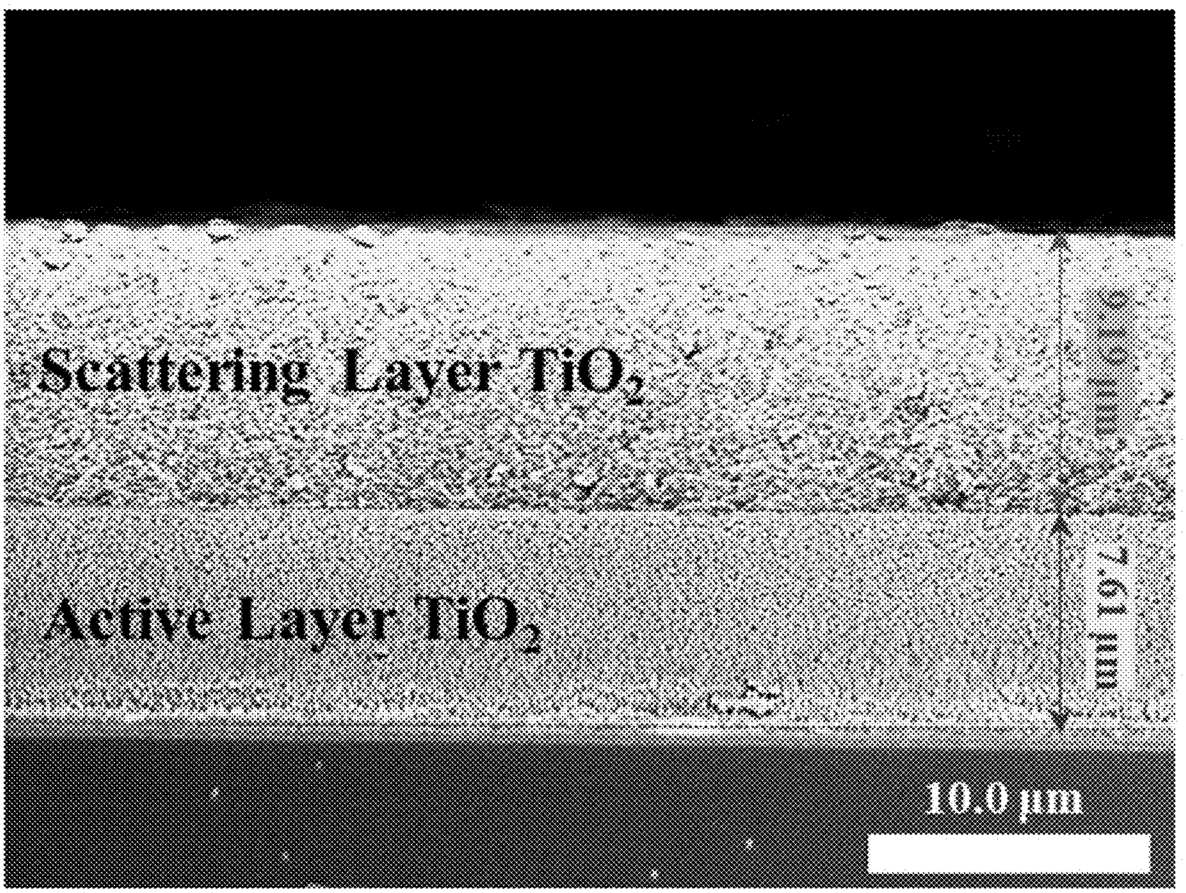
FIG. 4 shows results of observation of a radiation absorption layer according to Example 1 through High-Resolution Field Emission Scanning Electron Microscopy (HR-FE-SEM)

The betavoltaic battery according to Example 1 was acquired by treating the conductive substrate and the radiation absorption layer of the anode with titanium tetrachloride ($TiCl_4$), and the betavoltaic battery according to Comparative Example 1 was acquired without performing titanium tetrachloride ($TiCl_4$) treatment. FIG. 4 is an image showing results of observation of the radiation absorption layer according to Example 1 through High-Resolution Field Emission Scanning Electron Microscopy (HR-FESEM). The thicknesses of the first layer and the second, layer were 7.61 μm and 9.19 μm, respectively.

Figure 5:
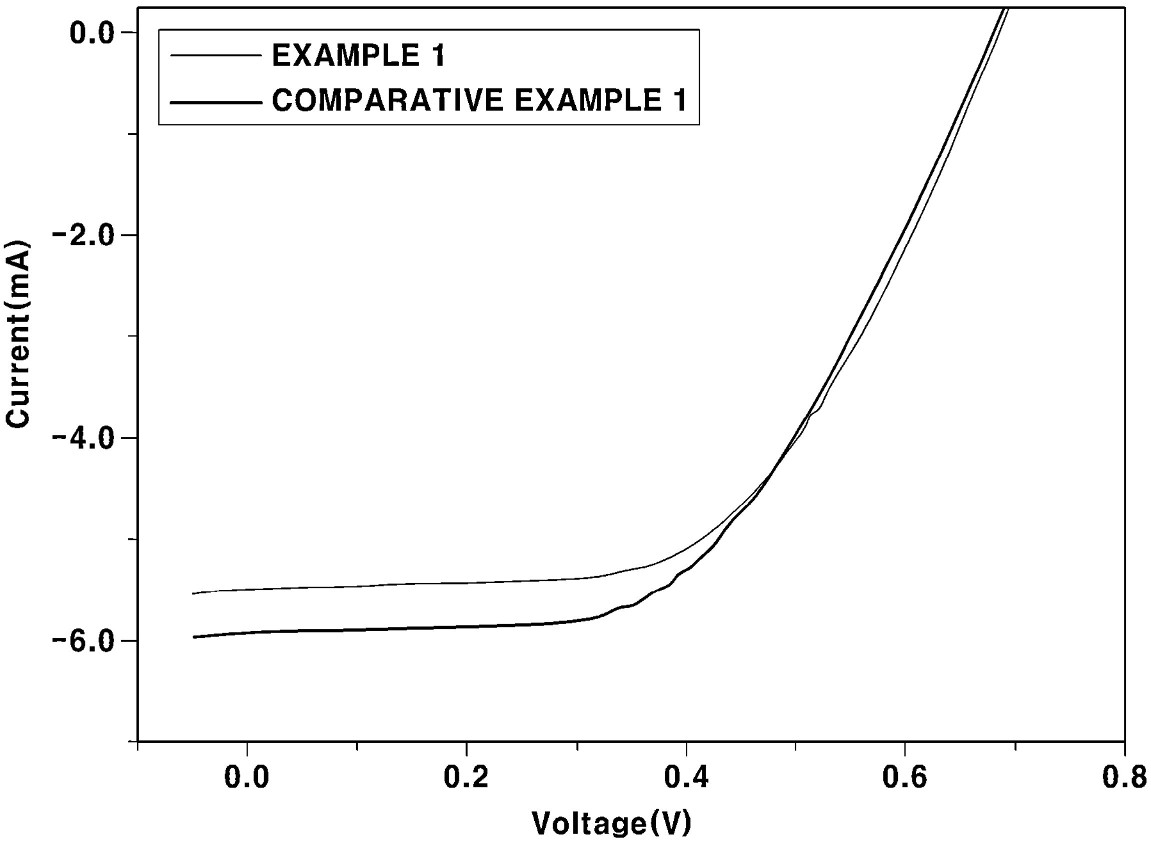
FIG. 5 shows results of measurement of performances of betavoltaic batteries according to Example 1 and Comparative Example 1 using a solar simulator.

Performances of the betavoltaic batteries according to Example 1 and Comparative Example 1 were measured using a solar simulator. The solar simulator measured voltages and currents of the betavoltaic batteries with 1 Sun output intensity by connecting an electric wire directly to the betavoltaic batteries. Results of measurements are shown in FIG. 5. Referring to this figure, it may be confirmed that the betavoltaic battery according to Example 1 has higher efficiency due to an increase in short-circuit current $J_{sc}$.

Further, the electrical characteristics of the betavoltaic batteries according to Example 1 and Comparative Example 1 were measured, and are set forth in Table 1 below. Referring to this table, it may be confirmed that the cell efficiency of the betavoltaic battery according to Example 1 was much higher than the cell efficiency of the betavoltaic battery according to Comparative Example 1.

TABLE 1

| Category | Voc [V] | Isc [mA] | Fill factor [%] | Efficiency [%] |
|---|---|---|---|---|
| Example 1 | 0.75 | 5.72 | 57.52 | 6.14 |
| Comp. Example 1 | 0.74 | 5.21 | 59.76 | 5.78 |

Performance Evaluation depending on Introduction of Quantum Dots

Example 2

Manufacture of Anode

FTO glass was put into 1% Mucasol® in water serving as a cleaning solution, and was sonicated for 30 minutes. The cleaned FTO glass and 7.5 ml of 40 mM $TiCl_4$ solution were put into a petri dish. The petri dish was placed on a hot plate of a temperature of about 70° C. for about 30 minutes. Thereafter, the hot plate was heated to about 500° C. at a rate of about 5° C./min, and was then heated for about 30 minutes.

A rectangular pattern having a size of 1.0 cm in width×0.4 cm in length was formed using a 3M® tape at the center of the FTO glass treated with titanium tetrachloride ($TiCl_4$). A paste including $TiO_2$ having an average particle diameter of about 20 nm was applied to the FTO glass having the pattern formed thereon. A first layer was formed by heating an acquired result to a temperature of about 500° C. at a rate of about 5° C./min, and then heating the result for about 30 minutes.

A paste including $TiO_2$ having an average particle diameter of about 300 nm was applied to the first layer. A second layer was formed by heating an acquired result to a temperature of about 500° C. at a rate of about 5° C./min, and then heating the result for about 30 minutes.

After formation of the second layer, the FTO glass and 7.5 ml of 40 mM $TiCl_4$ solution were put into a petri dish. The petri dish was placed on a hot plate of a temperature of about 70° C. for about 30 minutes. Thereafter, the hot plate was heated to about 500° C. at a rate of about 5° C./min, and was then heated for about 30 minutes.

A precursor solution was prepared by inputting 1 ml of an ammonia solution (including 0.1 ml of ammonium hydroxide and 9.9 ml of distilled water) to 10 ml of a mixed solution of an organic acid including $^{14}C$, which is a radioactive isotope of carbon, represented by Chemical Formula 2 below, and a solvent (including ethanol and distilled water at the ratio of 1:9).

Chemical Formula 2

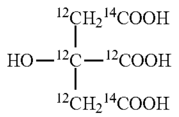

A beta emission layer was formed by applying total 50 μl of the precursor solution to the second layer dropwise while being dried at a temperature of about 80° C. Thereafter, an acquired result was heated to a temperature of about 200° C. at a rate of about 10° C./min, and was then heated for about 3 hours.

The result was immersed in 0.5 mM N719, which is a ruthenium (Ru)-based dye, at a room temperature for about 24 hours so that the dye was adsorbed onto the inorganic particles. Thereafter, the dye was washed off with anhydrous alcohol (99.5%), and was dried with an air gun.

Manufacture of Cathode

Two electrolyte inlets were formed in FTO glass using a drill. The FTO glass was put into anhydrous ethyl alcohol, and was cleaned through sonication for 30 minutes.

A platinum solution was prepared by mixing 0.05179 g of $H_2PtCl_4$ and 10 ml of isopropanol.

A rectangular pattern having a size of 1.0 cm in width×1.5 cm in length was formed using a 3M® tape on the FTO glass. An electrode layer was formed by dropping 10 μl of the platinum solution thereon three times. An acquired result was heated to about 400° C. at a rate of about 10° C./min, and was then heated for about 15 minutes.

Manufacture of Betavoltaic Battery

A stack was acquired by interposing a Surlyn® sheet cut to have a size of 1.0 cm in width×1.6 cm in length between the anode and the cathode, and then performing heat treatment at a temperature of about 120° C. An $I^-/I^{3-}$ electrolyte was injected into the electrolyte inlets.

Comparative Example 2

A betavoltaic battery was manufactured in the same manner as in Example 2 except that a compound excluding any radioactive isotopes was used as an organic acid.

Figure 6:
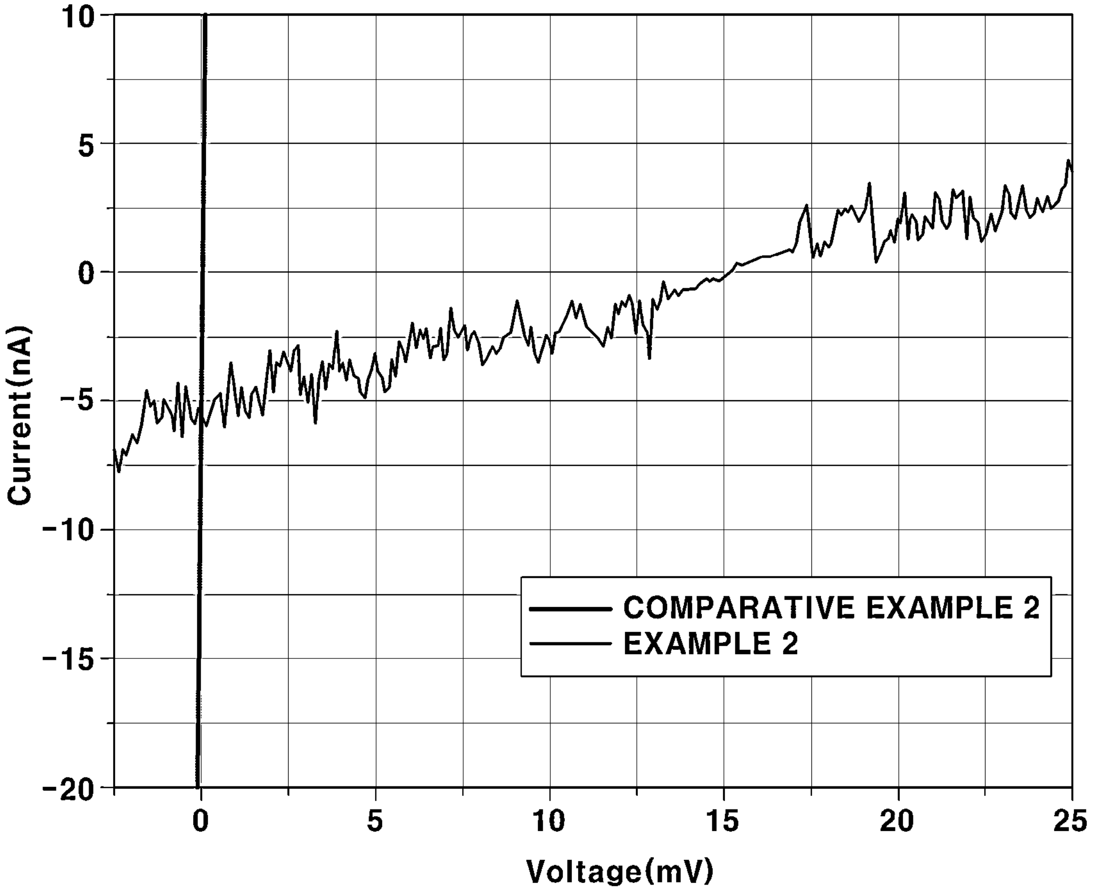
FIG. 6 shows results of measurement of performances of betavoltaic batteries according to Example 2 and Comparative Example 2 using a measuring instrument.

Performances of the betavoltaic batteries according to Example 2 and Comparative Example 2 were measured using a measuring instrument. Results of measurements are shown in FIG. 6. Further, the electrical characteristics of the betavoltaic batteries according to Example 2 and Comparative Example 2 were measured, and are set forth in Table 2 below.

TABLE 2

| Category | Voc [V] | Isc [mA] | Fill factor [%] | Efficiency [%] |
|---|---|---|---|---|
| Example 2 | 15.1 | 13.6 | 52.3 | 3.220 |
| Comp. Example 2 | 0.0539 | 19.8 | 20.0 | 0.003 |

Referring to this table, it may be confirmed that the betavoltaic battery according to Example 2 exhibited efficiency of 3.220%, and the betavoltaic battery according to Comparative Example 2 exhibited efficiency of 0.003%.

As is apparent from the above description, the present disclosure may provide a betavoltaic battery having a low energy loss.

Further, the present disclosure may provide a betavoltaic battery having improved electrochemical properties.

Moreover, the present disclosure may provide a betavoltaic battery having high energy absorption.

Various examples have been described in detail. However, it will be appreciated by those skilled in the art that changes may be made in the examples describe herein without departing from the principles and spirit of the invention, the scope of which is defined in the appended claims and their equivalents.

What is claimed is:

1. An anode comprising:

a conductive substrate;

a radiation absorption layer comprising at least one inorganic particle and a dye adsorbed onto the at least one inorganic particle, wherein the radiation absorption layer is disposed on the conductive substrate; and a beta emission layer comprising a quantum dot, wherein the beta emission layer is disposed on the radiation absorption layer, wherein the quantum dot comprises a radioactive isotope configured to emit a beta ray, wherein the radiation absorption layer comprises:

a first layer comprising a first inorganic particle having an average particle diameter of about 10 nm to about 50 nm and a first dye adsorbed onto the first inorganic particle; and a second layer comprising a second inorganic particle having an average particle diameter of about 100 nm to about 500 nm and a second dye adsorbed onto the second inorganic particle, wherein the second layer is disposed on the first layer, wherein the first layer contacts the conductive substrate and the second layer, and wherein the first layer is interposed between the conductive substrate and the second layer, and wherein the quantum dot comprises a heated product applied on the radiation absorption layer, wherein the heated product is resulting from a polymer of a compound, represented by Chemical Formula 1 below, and quaternary ammonium ions, Chemical Formula 1

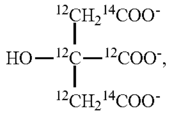

wherein $^{14}C$ indicates a radioactive isotope of carbon.

2. The anode of claim 1, wherein the conductive substrate comprises at least one of: fluorine doped tin oxide (FTO) glass, indium tin oxide (ITO) glass, indium zinc oxide (IZO) glass, aluminum doped zinc oxide (AZO) glass, gallium doped zinc oxide (GZO) glass, or any combination thereof.

3. The anode of claim 1, wherein the at least one inorganic particle comprises titanium dioxide ($TiO_2$).

4. The anode of claim 1, wherein the at least one inorganic particle is treated with titanium tetrachloride ($TiCl_4$).

5. The anode of claim 1, wherein the dye comprises at least one of: N719, N3, N749, or any combination thereof.

6. The anode of claim 1, wherein a thickness ratio of the first layer to the second layer is about 1:0.5 to about 1:2.

7. The anode of claim 1, wherein an average particle diameter of the quantum dot is about 6.5 nm to about 20 nm.

8. A betavoltaic battery comprising:

an anode according to claim 1;

an encapsulant disposed on the anode and impregnated with an electrolyte; and a cathode disposed on the encapsulant.

9. The betavoltaic battery of claim 8, wherein the cathode comprises:

a conductive substrate; and an electrode layer comprising a precious metal, wherein the electrode layer is disposed on the conductive substrate, and wherein the precious metal comprises platinum (Pt).

10. A method for manufacturing an anode for a betavoltaic battery, the method comprising:

forming a radiation absorption layer by applying at least one paste comprising at least one inorganic particle to a conductive substrate;

preparing a precursor solution by mixing an organic acid, represented by Chemical Formula 2 below, and an ammonia solution;

forming a beta emission layer comprising a quantum dot by applying the precursor solution to the radiation absorption layer and heating the precursor solution; and adsorbing a dye onto the at least one inorganic particle by immersing the radiation absorption layer in the dye, wherein the quantum dot comprises a radioactive isotope configured to emit a beta ray, Chemical Formula 2

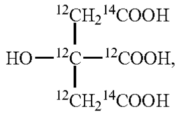

wherein $^{14}C$ indicates a radioactive isotope of carbon.

11. The method of claim 10, wherein:

the conductive substrate comprises at least one of: fluorine doped tin oxide (FTO) glass, indium tin oxide (ITO) glass, indium zinc oxide (IZO) glass, aluminum doped zinc oxide (AZO) glass, gallium doped zinc oxide (GZO) glass, or any combination thereof; and the conductive substrate is treated with titanium tetrachloride ($TiCl_4$).

12. The method of claim 10, wherein the at least one inorganic particle comprises titanium dioxide ($TiO_2$).

13. The method of claim 10, wherein the method further comprises treating the at least one inorganic particle with titanium tetrachloride ($TiCl_4$) by soaking the radiation absorption layer in titanium tetrachloride ($TiCl_4$) and performing heat treatment.

14. The method of claim 10, wherein the forming the radiation absorption layer comprises:

preparing a first layer by applying a paste comprising a first inorganic particle having an average particle diameter of about 10 nm to about 50 nm to the conductive substrate; and preparing a second layer by applying a paste comprising a second inorganic particle having an average particle diameter of about 100 nm to about 500 nm to the first layer.

15. The method of claim 14, wherein a thickness ratio of the first layer to the second layer is about 1:0.5 to about 1:2.

16. The method of claim 10, wherein the quantum dot comprises a heated product resulting from a polymer of a compound, represented by Chemical Formula 1 below, and quaternary ammonium ions, Chemical Formula 1

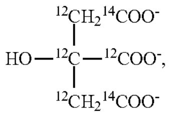

wherein $^{14}C$ indicates a radioactive isotope of carbon.

17. The method of claim 10, wherein an average particle diameter of the quantum dot is about 4 nm to about 20 nm.

18. The anode of claim 1, wherein the first dye is different from the second dye, wherein the first layer does not comprise the second inorganic particle, and wherein the second layer does not comprise the first inorganic particle.

19. The betavoltaic battery of claim 8, wherein the first dye is different from the second dye, wherein the first layer does not comprise the second inorganic particle, and wherein the second layer does not comprise the first inorganic particle.

20. The anode of claim 1, wherein the heated product is resulting from carbonization of the polymer of the compound and the quaternary ammonium ions.

* * * * *